United States Patent [19]

Cook

[11] 3,726,304
[45] Apr. 10, 1973

[54] FERTILIZER DISPENSER
[76] Inventor: Charles E. Cook, P.O. Box 231, Wilder, Idaho 83676
[22] Filed: Nov. 8, 1971
[21] Appl. No.: 196,502

[52] U.S. Cl. ............... 137/268, 23/272.7, 137/564.5
[51] Int. Cl. ............................................. F16k 51/00
[58] Field of Search ............... 137/268, 205.5, 564.5; 23/267, 271, 272.7, 272.8

[56] References Cited

UNITED STATES PATENTS 3,052,525  9/1962  Vogelmann ........................ 23/272.7
2,573,299  10/1951  Bast .................................. 137/564.5

FOREIGN PATENTS OR APPLICATIONS 1,197,065  7/1965  Germany ............................ 23/272.7

Primary Examiner—Henry T. Klinsiek
Assistant Examiner—Robert J. Miller
Attorney—John W. Kraft

[57] ABSTRACT

The fertilizer dispenser of the present invention comprises a tank having an elliptical shape and being disposed vertically with respect to its rectilinear axis on a suitable pedestal; a bladder made of a flexible, resilient material disposed within the tank and fastened to the lowermost interior end wall of the tank; a column disposed into the bladder from the lowermost interior end wall of the tank to a point distally from the uppermost terminal end of the tank; a fertilizer input tube operable to conduct fluid fertilizer under pressure from a suitable source to the lowermost terminal end of the tank into the bladder; a fertilizer output tube operable to conduct the fertilizer from the bladder and the tank into an irrigation water supply pipe; and a water governor tube operable to conduct water under pressure from the pipe to the interior walls of the tank and outside the bladder. The column may be made of an open mesh screen disposed about the connections of the fertilizer input tube and the fertilizer output tube.

3 Claims, 2 Drawing Figures

PATENTED APR 10 1973 3,726,304

CHARLES E. COOK    INVENTOR.

BY John W. Kraft

FERTILIZER DISPENSER

FIELD OF INVENTION

The present invention relates to fertilizer dispensers and more particularly to fertilizer dispensers which are operable to automatically compensate for variations in irrigation supply pipe pressure.

DESCRIPTION OF THE PRIOR ART

Fertilizer dispensers, intended for use in irrigation supply pipe fertilizer dispensing, commonly are not provided with means compensating for variations in supply pipe water pressure. Commonly, irrigation supply pipe water pressure may vary widely due to conditions related to water source and the pumping mechanism. Variations in water pressure tend to result in wide proportional variation in fertilizer concentration applied by irrigating devices supplied by the supply pipe.

Accordingly, it is an object of the present invention to provide means for dispensing fertilizer into an irrigation supply pipe which is provided with means for compensating for variations in water pressure.

It is a further object of this invention to provide compensating means employing apparatus which operate on pressure supplied by the irrigation pipe.

These and other objects shall become apparent from the description following, it being understood that modifications may be made without affecting the teachings of the invention here set out.

SUMMARY OF THE INVENTION

Generally, the fertilizer dispenser of the present invention comprises a tank having an elliptical shape and being disposed vertically with respect to the rectilinear axis on a suitable pedestal; a bladder made of a flexible, resilient material disposed within the tank and fastened to the lowermost interior end wall of the tank; a column disposed into the bladder from the lowermost interior end wall of the tank to a point distally from the uppermost terminal end of the tank; a fertilizer input tube operable to conduct fluid fertilizer under pressure from a suitable source to the lowermost terminal end of the tank into the bladder; a fertilizer output tube, operable to conduct the fertilizer from the bladder and the tank into an irrigation water supply pipe; and a water governor tube operable to conduct water under pressure from the pipe to the interior walls of the tank and outside the bladder. The column may be made of an open mesh screen disposed about the connections of the fertilizer input tube and the fertilizer output tube.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
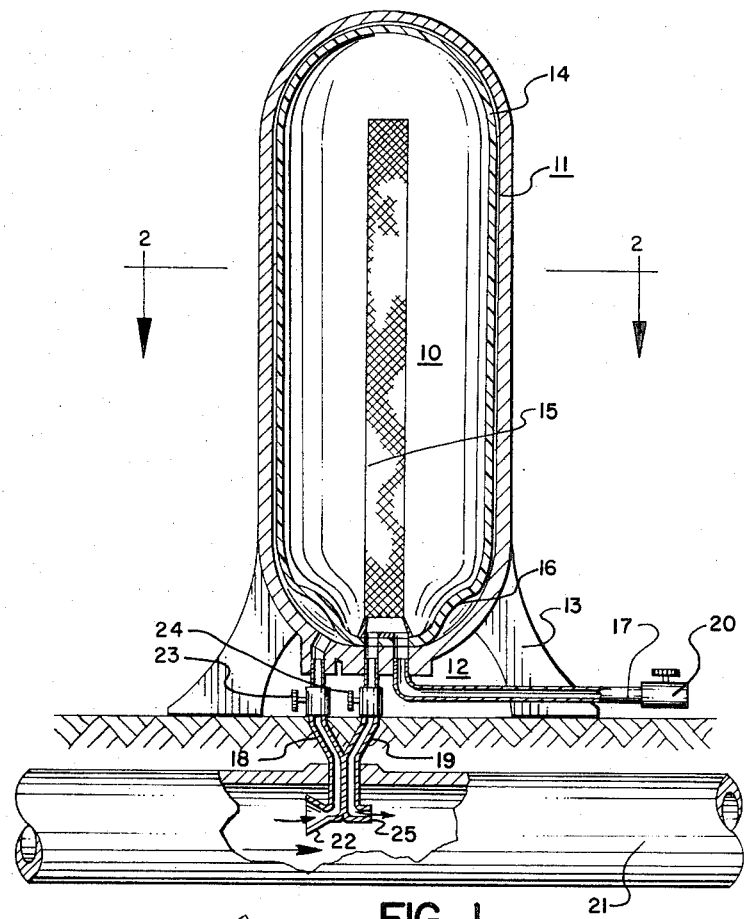
FIG. 1 is a cross-sectional elevational view of the fertilizer dispenser of the present invention showing the elliptical tank, supply conduits, and a commonly known water supply pipe with a portion of its wall cut away to show the water input orifice and the fertilizer water output orifice of this invention.
Figure 2:
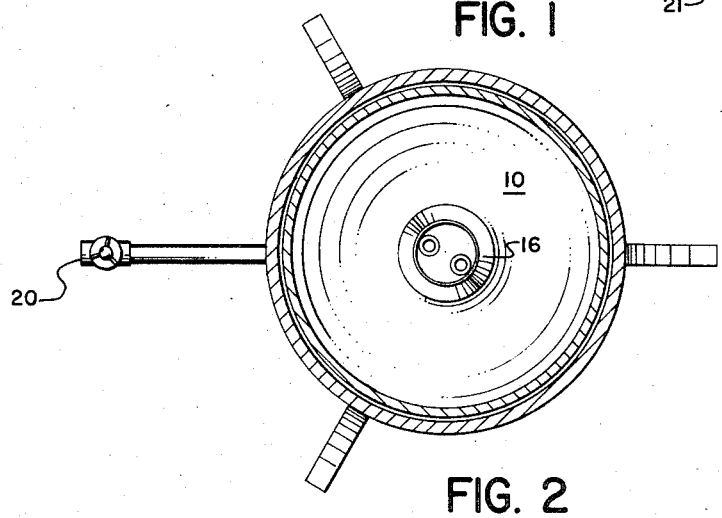
FIG. 2 is a top plan cross-sectional view taken substantially along the lines 2—2 of the FIG. 1 showing the configuration of the input and output supply tubes disposed in the elliptical tank.

Referring now to the drawings and more particularly to the FIG. 1, the fertilizer dispenser of the present invention is shown to advantage and identified by the numeral 10. Generally, the present invention comprises an elliptical tank 11 and supply tubes 12. The elliptical tank 11 is disposed with its rectilinear axis vertically with respect to the ground on a suitable pedestal 13. It has been found to advantage to use an elliptically-shaped tank 11 to facilitate draining of fluid from the tank 11. The tank 11 includes a bladder 14 fastened to the lowermost terminal end of the tank 11. The bladder 14 may be made of any of a number of flexible resilient materials which when the tank 11 is filled conform to the inner terminal walls of the tank 11. The bladder 14 provides a means of controlling fluid flow out of the tank 11, in a manner hereinafter later described. The tank 11 includes a filter column 15 upstandingly disposed into the interior of the tank 11 from its lowermost terminal end to a point distally from the end opposite. That is, the filter column 15 extends from the lowermost terminal end of the elliptical tank 11 along the rectilinear axis to a point distally from the end opposite its lowermost terminal end. The filter column 15 provides support means to a collapsed bladder 14 when the tank 11 is not filled. The filter column 15 may be made of porous materials, such as open mesh wire or the like, which will permit fluid to flow through the filter column 15. The lowermost terminal end of the filter column 15, which is fastened through the bladder 14 to the lowermost terminal end on the interior wall of the elliptical tank 11, is provided with a cone-shaped filter pedestal 16 which is operable to enclose a portion of the lowermost terminal end of the elliptical tank 11, and to thereby cover the fertilizer input tube and the fertilizer output tube hereinafter described.

The supply tubes 12 generally comprise a fertilizer input tube 17, a water governor tube 18, and a fertilizer output tube 19. The fertilizer input tube 17 conducts liquid fertilizer under pressure from a suitable source into the lowermost terminal end of elliptical tank 11 and into the bladder 14 below the cone-shaped pedestal 16 of the filter column 15. The fertilizer input tube 17 may be selectively controlled by a valve 20. The water governor tube 18 conducts water from a commonly known water supply pipe 21 to the elliptical tank 11. The water governor tube 18 is provided with a water supply jam 22 inside the pipe 21. The Jam 22 may be a cone-shaped jam having its widest terminal end disposed in the direction from which water flow is coming. Flow thus derived from the water supply pipe 21 may be selectively controlled by a valve 23. The water governor tube 18 joins the elliptical tank 11 at a point distally above its lowermost terminal end. The bladder 14 is disposed between the exitway of the governor tube 18 and the pedestal 16. That is to say, water carried by the tube 18 is conducted between the interior wall of the tank 11 and the exterior wall of the bladder 14, and tends to collapse the bladder 14 inwardly, toward the column 15. The fertilizer output tube 19 is disposed at the lowermost terminal end of the elliptical tank 11, and is operable to conduct fertilizer from an elliptical tank 11 to the pipe 21. The fertilizer output tube 19 has its entranceway at the lowermost terminal end of the elliptical tank 11 below the pedestal 16. The fertilizer output tube 19 may be selectively controlled by means of a valve 24. The fertilizer output tube 19 is provided with an orifice 25 disposed distally within the interior walls of the pipe 21. The orifice 25 is disposed with its exitway in the direction in which the water is traveling.

In operation, fertilizer applied into the elliptical tank 11 and the bladder 14 through the fertilizer input tube 17 is diffused by the mesh of the fertilizer column 15 into the tank 11. Pressure of the fertilizer supplied by the input supply tube 17 will tend to expand the bladder 14. Water is supplied between the interior walls of the elliptical tank 11 and the exterior walls of the bladder 14 by the water governor tube 18. As a result of pressure developed by the jam 22, the pressure of material between the interior walls of the elliptical tank 11 and the exterior walls of the bladder 14 will tend to force the bladder 14 inwardly toward the filter column 15. Pressure on the outside of the bladder 14 forces fluid through the fertilizer output tube 19 into the pipe 21. An increase in water pressure in the pipe 21 will cause a directly proportional increase in the pressure between the interior walls of the tank 11 and the exterior walls of the bladder 14, and will cause increased amounts of fertilizer to be dispensed into the pipe 21. Conversely, a decrease in pressure in the pipe 21 will result in a directly proportional decrease in the pressure between the interior walls of the tank 11 and the exterior walls of the bladder 14, and result in a reduction in the amount of fertilizer dispensed to the pipe 21.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A fertilizer dispenser, comprising
    a tank having an elliptical shape disposed vertically with respect to its rectilinear axis on a suitable pedestal;
    a bladder made of flexible, resilient material disposed within said tank and fastened to the lowermost interior end wall of said tank;
    a column disposed into said bladder from the lowermost interior end wall of said tank to a point distally from the uppermost terminal wall of said tank;
    a fertilizer input tube operable to conduct fluid fertilizer under pressure from a suitable source to the lowermost terminal end of said tank into said bladder;
    a fertilizer output tube operable to conduct said fertilizer from said bladder and said tank into an irrigation water supply pipe; and
    a water governor tube operable to conduct water under pressure from said pipe to the interior walls of said tank and outside said bladder.

2. The apparatus of claim 1, wherein the column includes open mesh cylindrical walls, and a pedestal connecting the lowermost terminal end of said column to said lowermost interior end wall of said tank, said pedestal operable to fasten said bladder to said tank and encircle the connection of said fertilizer input tube and the connection of said fertilizer output tube with said tank.

3. The apparatus of claim 1, wherein said water governor includes a cone-shaped jam disposed distally within said pipe, said jam having its widest end disposed in the direction from which the irrigation water is traveling; and wherein said fertilizer output tube includes an orifice disposed distally within said pipe, said orifice having its exitway disposed in the direction in which said irrigation water is traveling.

* * * * *